United States Patent
Boutboul

(10) Patent No.: US 8,935,417 B2
(45) Date of Patent: Jan. 13, 2015

(54) METHOD AND SYSTEM FOR AUTHORIZATION AND ACCESS CONTROL DELEGATION IN AN ON DEMAND GRID ENVIRONMENT

(75) Inventor: Irwin Boutboul, Jersey City, NJ (US)

(73) Assignee: International Business Machines Corporation, Armonk, NY (US)

(*) Notice: Subject to any disclaimer, the term of this patent is extended or adjusted under 35 U.S.C. 154(b) by 1522 days.

(21) Appl. No.: 12/060,299

(22) Filed: Apr. 1, 2008

(65) Prior Publication Data

US 2008/0183872 A1 Jul. 31, 2008

Related U.S. Application Data

(63) Continuation of application No. 11/453,487, filed on Jun. 15, 2006.

(51) Int. Cl.
*H04L 29/06* (2006.01)
*H04L 12/24* (2006.01)

(52) U.S. Cl.
CPC .............. *H04L 63/101* (2013.01); *H04L 41/28* (2013.01); *H04L 41/044* (2013.01); *H04L 63/0823* (2013.01)
USPC ....................................................... 709/229

(58) Field of Classification Search
CPC ...... H04L 41/044; H04L 41/28; H04L 63/101
USPC ........................ 709/217, 225, 226, 229, 223
See application file for complete search history.

(56) References Cited

U.S. PATENT DOCUMENTS

| | | | |
|---|---|---|---|
| 6,158,010 A * | 12/2000 | Moriconi et al. | 726/1 |
| 6,772,350 B1 | 8/2004 | Belani et al. | |
| 6,901,448 B2 | 5/2005 | Zhu et al. | |
| 7,007,093 B2 | 2/2006 | Spicer et al. | |
| 7,028,181 B1 | 4/2006 | McCullough et al. | |
| 7,421,500 B2 * | 9/2008 | Talwar et al. | 709/227 |
| 7,424,475 B2 | 9/2008 | Ishii et al. | |
| 7,493,390 B2 | 2/2009 | Bobde et al. | |
| 7,512,965 B1 * | 3/2009 | Amdur et al. | 726/1 |
| 7,657,746 B2 * | 2/2010 | Paramasivam et al. | 713/168 |
| 2004/0177249 A1 | 9/2004 | Keohane et al. | |
| 2004/0221037 A1 * | 11/2004 | Costa-Requena et al. | 709/225 |
| 2004/0254934 A1 | 12/2004 | Ho et al. | |
| 2005/0060349 A1 | 3/2005 | Shirin et al. | |
| 2005/0110609 A1 | 5/2005 | Mosgrove et al. | |
| 2005/0138175 A1 * | 6/2005 | Kumar et al. | 709/226 |

(Continued)

OTHER PUBLICATIONS

Boutboul, Irwin, U.S. Appl. No. 11/453,487, Office action Communication, Oct. 14, 2009, 9 pages.

(Continued)

*Primary Examiner* — Kristie Shingles
(74) *Attorney, Agent, or Firm* — Gibb & Riley, LLC

(57) ABSTRACT

The method of the invention provides for dynamic on-demand delegation of control and access in a grid computing environment comprising granting authority of a grid node to a first moderator by a superauthority; admitting the first moderator to the grid node; modifying the access control list of the grid node by the first moderator; inviting other entities listed on the access control list to access the grid node; and issuing a unique authorization certificate to each of the other entities, wherein the first moderator controls the inviting of the other entities without contact with or accessing to the superauthority for certification.

15 Claims, 3 Drawing Sheets

(56) References Cited

U.S. PATENT DOCUMENTS

| | | |
|---|---|---|
| 2005/0240777 A1 | 10/2005 | Keohane et al. |
| 2005/0270982 A1 | 12/2005 | McBeath |
| 2006/0179438 A1* | 8/2006 | Jackson .................. 718/104 |
| 2006/0294238 A1* | 12/2006 | Naik et al. .................. 709/226 |
| 2007/0011281 A1* | 1/2007 | Jhoney et al. ............... 709/220 |
| 2007/0112574 A1* | 5/2007 | Greene ......................... 705/1 |
| 2007/0156813 A1 | 7/2007 | Galvez et al. |
| 2008/0005115 A1* | 1/2008 | Corley et al. .................. 707/9 |

OTHER PUBLICATIONS

Boutboul, Irwin, U.S. Appl. No. 11/453,487, Office action Communication, Apr. 16, 2009, 11 pages.

* cited by examiner

METHOD AND SYSTEM FOR AUTHORIZATION AND ACCESS CONTROL DELEGATION IN AN ON DEMAND GRID ENVIRONMENT

CROSS-REFERENCE TO RELATED APPLICATIONS

This application is a Continuation of U.S. application Ser. No. 11/453,487 filed Jun. 15, 2006, the complete disclosure of which, in its entirety, is herein incorporated by reference.

BACKGROUND

1. Field of the Invention

The embodiments of the invention generally relate to computer security, and, more particularly, to computer security and access control in grid computing environments.

2. Description of the Related Art

With the advent of collaborative computing and data sharing, more and more new modes of interaction have evolved resulting in the use of distributed resources for large-scale scientific research. Work within this collaborative computing environment has led to the development of grid technologies, which have become involved in scientific and enterprise computing.

In grid computing, heterogeneous resources distributed geographically are virtualized as a unified whole. Grid computing, as a result, provides enormous opportunity in terms of resource sharing, maximization of resource utilization and virtualization of resources. Grid computing has potential for the not only the scientific community, but also the enterprise information technology (IT) communities.

However, there are security issues and implications in the wide-spread use of grid computing. Because grid computing involves running of applications in diverse environments, different types of security issues arise. Issues in security in the area of grid computing can be broadly classified into system level, architectural, and interoperability issues.

System level security issues deal with the problem of running a foreign application in one's system. Architectural security issues deal with the development of a secure infrastructure for the grid system. Interoperability issues include establishing a secure infrastructure including encryption, authentication and authorization in a grid based environment.

Current grid solutions for dealing with authentication and authorization rely on a Public Key Infrastructure (PKI) where every end entity owns a X509 certificate and authentication against grid nodes are done through common PKI mechanisms with a trusted authority. However authorization is handled at a different level, usually by the means of a separate asynchronous process like grid-map files. This second process is not dynamic and is difficult to tie with the authentication process in an on demand environment where authorization can be granted and denied on demand.

U.S. Pat. No. 6,901,448, incorporated herein by reference, discloses a method for a distributed collaborative computing environment and a security protocol involving encryption processes. U.S. Pat. No. 7,028,181, incorporated herein by reference, discloses a system and method for revocation of a signature certificate in a PKI.

SUMMARY

The method of the present invention provides for flexible on-demand authorization and authentication of entities wishing to access grid nodes, when the grid is used for real time collaboration between different parties. The method of the invention provides for dynamic on-demand delegation of control and access in a grid computing environment comprising: granting authority of a grid node to a moderator by a superauthority; admitting the moderator, which is a user having special access, to the grid node; modifying the access control list of the grid node by the moderator; inviting other entities listed on the access control list to access the grid node; and said moderator issuing a unique authorization certificate to each of the other entities, wherein the moderator controls the inviting of the other entities without the need for contact with or access to the superauthority for certification.

In view of the foregoing, an embodiment of the invention provides that the modification of the access control list of the grid node includes adding or deleting/removing other entities (e.g., client, users, etc.) on the grid node's access control list. Embodiments of the invention further comprise the moderator delegating authority to privileged users or additional moderators. The moderator controls the delegation of privileged users or additional moderators without contacting or accessing the superauthority for certifications or authorization. It will be understood to those of skill in the art that as used herein, the terms additional moderator or privileged user may be used interchangeably herein.

In another embodiment of the invention, the modification of the access control list can be performed by either the moderator or the privileged user. The privileged users, however, cannot revoke or remove the moderator's authority to assign new privileged users or moderators or assign new users to the access control list of the grid node. The privileged users or additional moderators can delegate other moderators in addition to modifying the access control list.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS

Figure 1:
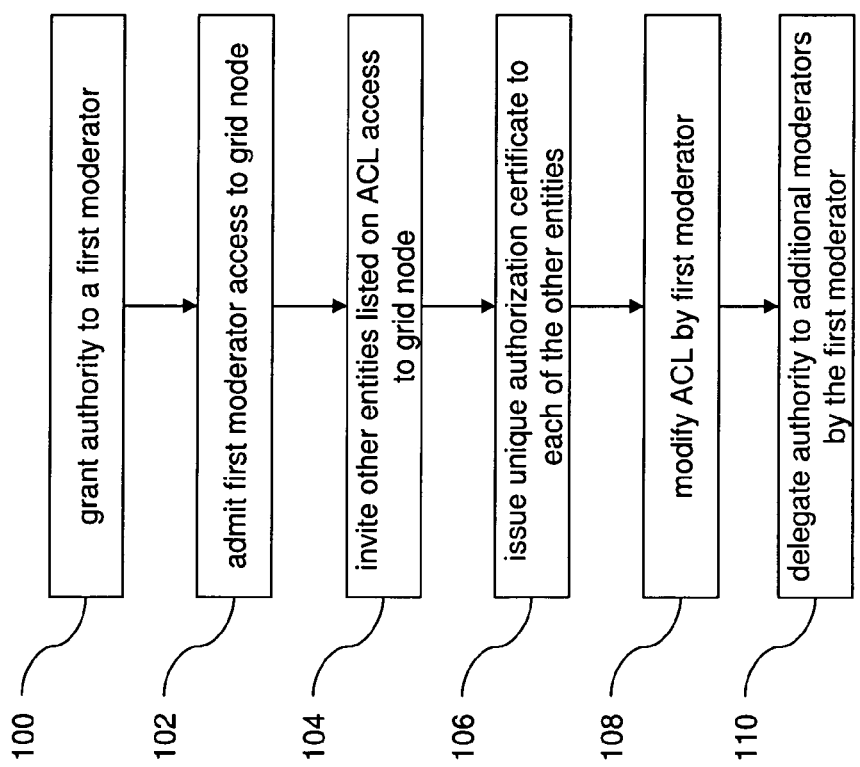
FIG. 1 illustrates a flow diagram illustrating a preferred method of an embodiment of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

Figure 2:
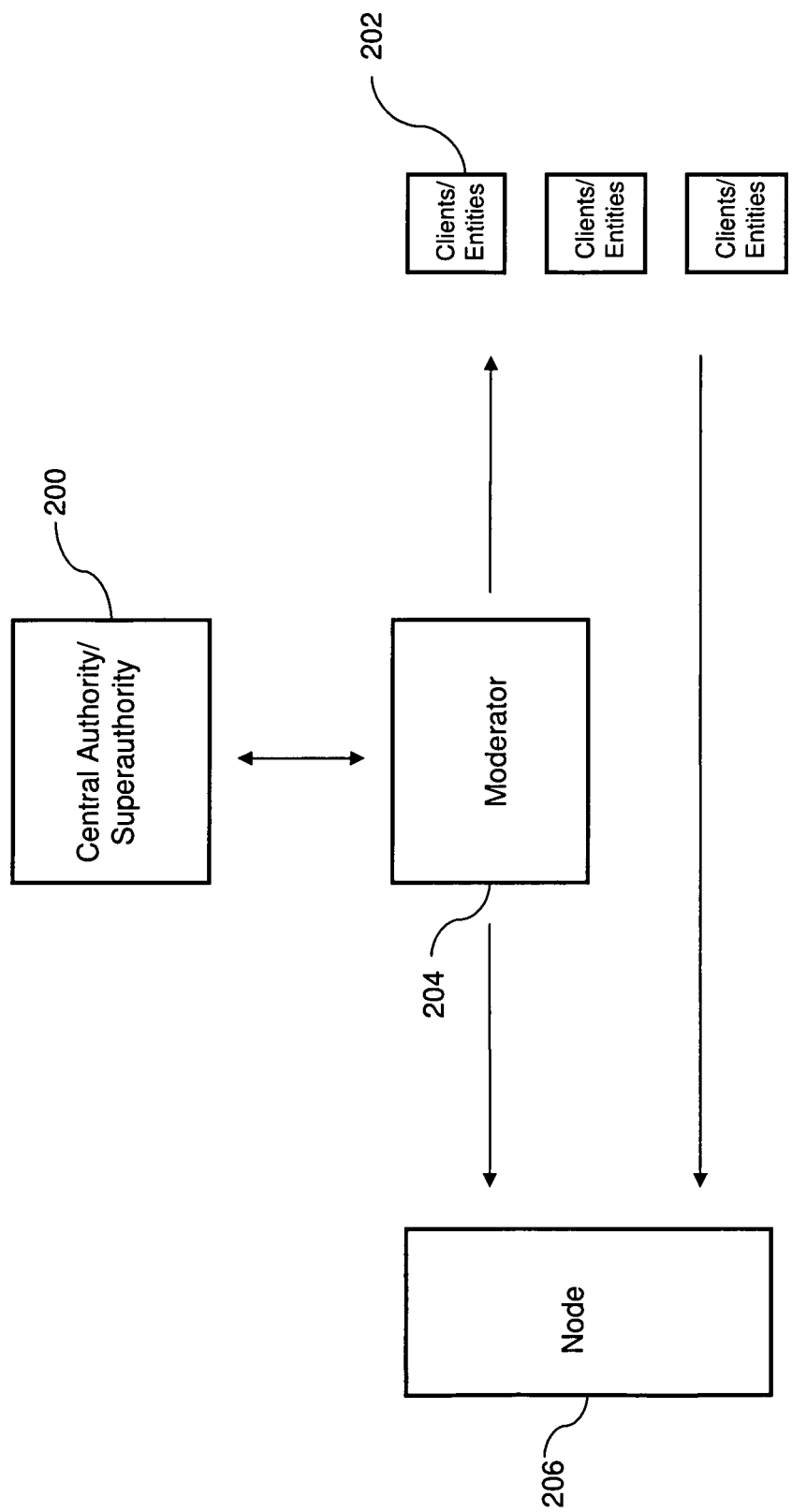
FIG. 2 is a schematic diagram of a the communication network of moderator, superauthority, node and client (user)
Figure 3:
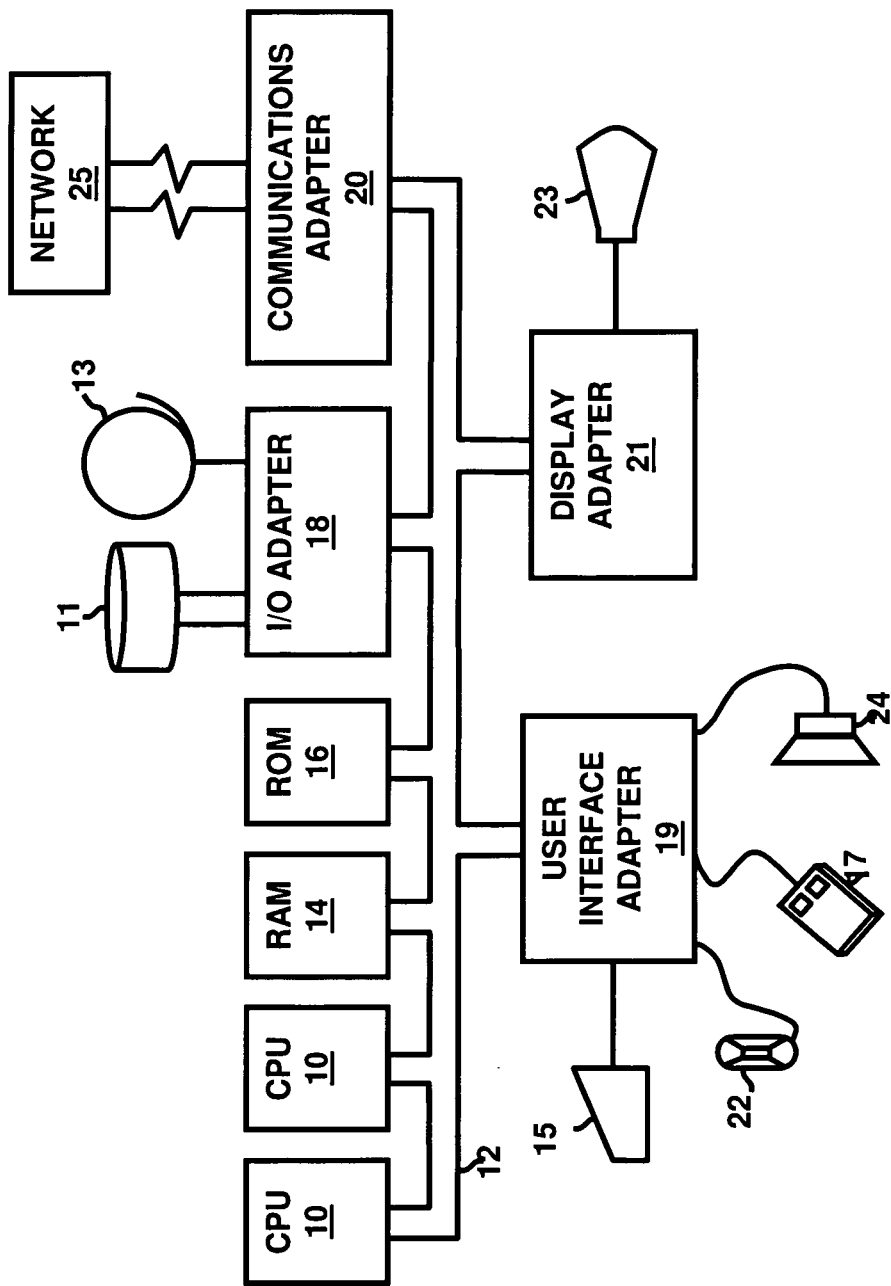
FIG. 3 is representative hardware environment for practicing the embodiments of the invention.

As mentioned, there remains a need for flexible on-demand authorization and authentication of entities wishing to access grid nodes, when the grid is used for real time collaboration between different parties. The embodiments of the invention achieve this by providing a method for dynamic delegation of control in a grid computing environment. Referring now to the drawings, and more particularly to FIGS. 1 through 3 where similar reference characters denote corresponding features consistently throughout the figures, there are shown preferred embodiments of the invention.

The invention, described herein, delegates control of a node in a grid environment in a scalable and dynamic way. FIG. 1 illustrates a flow diagram of the. A method for dynamic delegation of control in a grid computing environment comprising: granting authority of a grid node to a moderator, which is a user having special access, by a superauthority (100); admitting the moderator to the grid node (102); modifying an access control list (ACL) of the grid node by the moderator (108). The modification of the access control list includes adding or deleting other entities (e.g., users, clients, etc.). The method further comprises inviting the other entities listed on the access control list to access the grid node (104); and the moderator, or in certain embodiments, privileged user, issuing a unique authorization certificate to each of the other entities (106), wherein the moderator controls the inviting of the other entities without the need for the moderator or the other entities to contact the superauthority for authorization certificates.

The method further comprises steps wherein the moderator delegates authority to privileged users (additional moderators) (110). Again, the first moderator controls the delegation of privileged users having moderator abilities without the need for contact with the superauthority. The first moderator and privileged users have the authority to modify the access control list and assign or remove new moderators. However, the privileged users have all the authority of a moderator with the exception that privileged users may not remove the first moderator from the grid node. The moderator may remove himself from the node and assign a new moderator, having the full authority of the first moderator.

Moderators can be considered within the context of the invention users with the same privileges of a super authority, i.e., "super users." Thus, moderators have superior access control and abilities that the regular users do not have. The super authority, is an authority which grants authorization certificates to moderators of a node and can make a regular user a 'super user' or moderator, by granting specific credentials (X509 certificates usually).

A moderator, e.g., a super user, can make other people privileged users, but not super users, as only the super authority can make those people super users. Privileged users, i.e., additional moderators, are granted different abilities. The most basic one is to get access to the resources, and the other ability they can be granted by the super user/moderator is the ability to make other people privileged users and/or remove their privileged ability. The only thing that privileged users will not be able to do is revoke the 'super user' ability of the super user. In that sense, the super user will always have overriding capabilities over its delegated privileged users. A super user/moderator can grant any capability to privileged users can be anything and everything, and should not be limited, e.g., granting access to local machine/node and granting ability to delegate this access to other people.

Another embodiment of the invention involves a computer program product readable by machine, tangibly embodying a program of instructions executable by said machine to perform the method for dynamic delegation of control in a grid computing environment described herein. Yet another embodiment of the invention is a service for dynamic delegation of control in a grid computing environment comprising: granting authority of a grid node to a first moderator by a superauthority; admitting the first moderator entity to the grid node; modifying an access control list of the grid node by the first moderator; inviting other entities listed on the access control list to access the grid node; and issuing a unique authorization certificate to each of the other entities.

FIG. 2 illustrates schematically the various entities in the method described herein. The moderator receives a certificate from the central authority/superauthority (200) to access the grid node (206) and to modify access to the grid node. The moderator (204) which controls modification of the access control list, assignment or removal of clients (e.g., user, entities, etc.) (202) to the grid node (206).

FIG. 3 illustrates a flow diagram according to an embodiment of the invention. The embodiments of the invention can take the form of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments of the invention is depicted in FIG. 3. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

More particularly describing the invention, a third party is not required for the delegation of control during the process to achieve scalability. Once entity A (e.g., the moderator) has gained control over machine X (e.g., the grid node), through regular grid access control approaches, entity A can delegate control to entity B (e.g., users, clients, etc.) directly by updating the ACL of machine X. Machine X will grant access to entity B as long as entity A's access is valid. When entity A's access expires, entity B's access will expire as well. Thus, the delegation control process is dynamic. At any time, any moderator entity that has control over the node can terminate another entity's access control rights and operations. One goal of the invention is to provide authentication and authorization among grid nodes in a dynamic and real time environment. Although in some embodiment other entities may access the superauthority, generally, only the moderator needs to access the superauthority; thus, providing flexible access to the grid node in collaborative computing environments.

Only one entity needs to contact a super authority to get access to a grid node. All other entities will be able to authenticate and authorize against this grid node without having to access a third party (e.g., superauthority). The ACLs can be dynamically updated in real time without disruption of the service and without intervention of a third party. This method is advantageous because it can delegate access control in a distributed system without having to contact a central/third party authority as it is common most systems.

Even more particularly, assuming N entities need to connect to grid node A for collaboration, each entity needs to be authenticated and authorized. A first entity, e.g., the as moderator, may obtain a credential or proxy certificate to access the node A. A regular super authority will deliver this proxy certificate after authentication and an authorization check.

The moderator will then present this proxy to node A to gain access. Node A will check that the proxy is valid and signed by the super authority, then grant access to the moderator. Once the moderator controls the application on node A, the moderator will be able change the dynamic ACL for this application instance through a secure connection. Node A will then invite the (N−1) other entities to access the application on node A. Each entity X in turn will directly contact node A and show a unique certificate (e.g., X509 certificate, etc.) for authentication purpose through a secure sockets layer (SSL) connection. Node A, after checking authentication of entity X, through regular PKI processes, will check authorization against the dynamic ACL created by the moderator. The entity X will then either be granted or denied access. The entity X in the present embodiment may include client, users or even another grid nodes.

The moderator M can delegate its moderator ability to other clients once granted access. This delegation is done securely over a SSL connection with the application on node A. As a result, even if the moderator leaves the application, there are still other moderators who can control the access to the application, either by inviting other clients or denying other clients. With this process, all clients are authenticated and authorized correctly against a grid node without having to contact a third party superauthority for managing authorization. As a result, a scalable and dynamic method for authenticating and authorizing clients to access a grid application is achieved.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of preferred embodiments, those skilled in the art will recognize that the embodiments of the invention can be practiced with modification within the spirit and scope of the appended claims.

What is claimed is:

1. A computer-implemented method for dynamic delegation of control in a grid computing environment comprising:
    granting authority of a grid node, by a computing device, to a moderator by a superauthority, wherein said superauthority grants a specific credentialed authorization certificate to said moderator;
    admitting, by said computing device, said moderator to said grid node based on said grid node checking that said specific credentialed authorization certification of said moderator is valid and signed by said superauthority;
    modifying, by said computing device, an access control list of said grid node by said moderator; and
    inviting, by said grid node, other entities listed on said access control list to access said grid node,
    wherein said moderator controls said inviting of said other entities by modifying said access control list without contact with said superauthority,
    wherein said grid node enables real time collaboration between different entities in said grid computing environment that virtualizes geographically distributed heterogeneous computing resources as a unified whole.

2. The method of claim 1, wherein said modifying comprising adding or deleting said other entities on said access control list.

3. The method of claim 1, further comprising issuing a unique authorization certificate to each of said other entities.

4. The method of claim 1, further comprising delegating privileged users by said moderator, wherein said moderator controls said delegating privileged users without contact with said superauthority.

5. The method of claim 4, wherein said modifying of said access control list is performed by either said moderator or said privileged users.

6. The method of claim 4, wherein said delegating of said privileged users is performed by said moderator or privileged users.

7. A computer-implemented method for dynamic delegation of control in a grid computing environment comprising:
- granting authority of a grid node, by a computing device, to a moderator by a superauthority, wherein said superauthority grants a specific credentialed authorization certificate to said moderator;
- admitting, by said computing device, said moderator to said grid node based on said grid node checking that said specific credentialed authorization certification of said moderator is valid and signed by said superauthority;
- modifying, by said computing device, an access control list of said grid node by said moderator;
- inviting, by said grid node, other entities listed on said access control list to access said grid node; and
- issuing, by said computing device, a unique authorization certificate to each of said other entities that is authenticated by said grid node,
- wherein said moderator controls said inviting of said other entities by modifying said access control list without contact with said superauthority,
- wherein said grid node enables real time collaboration between different entities in said grid computing environment that virtualizes geographically distributed heterogeneous computing resources as a unified whole.

8. The method of claim 7, wherein said modifying comprising adding or deleting said other entities on said access control list.

9. The method of claim 7, further comprising delegating privileged users by said moderator, wherein said moderator controls said delegating privileged users without contact with said superauthority.

10. The method of claim 9, wherein said modifying of said access control list is performed by either said moderator or said privileged users.

11. The method of claim 9, wherein said delegating of said privileged users is performed by said moderator or said privileged users.

12. A non-transitory computer program product readable by machine, tangibly embodying a program of instructions executable by said machine to perform a method for dynamic delegation of control in a grid computing environment, said method comprising:
- granting authority of a grid node to a moderator by a superauthority, wherein said superauthority grants a specific credentialed authorization certificate to said moderator;
- admitting said moderator to said grid node based on said grid node checking that said specific credentialed authorization certification of said moderator is valid and signed by said superauthority;
- modifying an access control list of said grid node by said moderator wherein said modifying comprises one of adding and deleting other entities on said access control list;
- inviting, by said grid node, said other entities listed on said access control list to access said grid node; and
- issuing a unique authorization certificate to each of said other entities that are authenticated by said grid node,
- wherein said moderator controls said inviting of said other entities by modifying said access control list without contact with said superauthority,
- wherein said grid node enables real time collaboration between different entities in said grid computing environment that virtualizes geographically distributed heterogeneous computing resources as a unified whole.

13. The non-transitory computer program product of claim 12, further comprising delegating privileged users by said moderator, wherein said moderator controls said delegating privileged users without contact with said superauthority.

14. The non-transitory computer program product of claim 13, wherein said modifying of said access control list is performed by either said moderator or said privileged users.

15. The non-transitory computer program product of claim 13, wherein said delegating of said privileged users is performed by said moderator or said privileged users.

* * * * *